2/14/84 OR 4,430,898

United States Patent [19]

Trimmer et al.

[11] 4,430,898

[45] Feb. 14, 1984

[54] PULSE-ECHO ULTRASOUND SYSTEM UTILIZING CONJUGATE EMITTING AND RECEIVING APERTURES

[75] Inventors: William S. Trimmer, Belle Mead; David H. R. Vilkomerson, Princeton, both of N.J.

[73] Assignee: Technicare Corporation, Solon, Ohio

[21] Appl. No.: 335,919

[22] Filed: Dec. 30, 1981

[51] Int. Cl.³ .............................................. G01N 29/04

[52] U.S. Cl. ......................................... 73/624; 73/632

[58] Field of Search .................. 73/624, 627, 628, 632

[56] References Cited

U.S. PATENT DOCUMENTS 2,398,701 4/1946 Firestone .............................. 73/629

2,625,035 1/1953 Firestone .............................. 73/627

3,546,924 12/1970 Nussbaum et al. .................. 73/627

4,079,352 3/1978 Burkhardt et al. .

*Primary Examiner*—James J. Gill

[57] ABSTRACT

A novel method for imaging body tissues is disclosed wherein an ultrasonic pulse having a radially asymmetric side-lobe pattern surrounding a central focal lobe is generated. A receiver for receiving echoes of this pulse is provided which exhibits a sensitivity to echoes from the aforementioned side-lobe pattern which is relatively decreased by comparison to its sensitivity to echoes from the central focal lobe. In the preferred embodiment, square transducers which are rotated with respect to the focal axis by about 45° are used to practice the disclosed method.

17 Claims, 11 Drawing Figures

PULSE-ECHO ULTRASOUND SYSTEM UTILIZING CONJUGATE EMITTING AND RECEIVING APERTURES

CROSS REFERENCE TO RELATED APPLICATIONS

The present application is related to the copending patent application of Andreas Hadjicostis, entitled "Short Ring Down, Ultrasonic Transducer Suitable For Medical Applications", Ser. No. 335,920, filed Dec. 30, 1981 which is assigned to the assignee of the present application and is hereby incorporated by reference as if fully set forth herein.

FIELD OF THE INVENTION

The present invention relates to the field of medical diagnosis using pulse-echo ultrasound imaging systems, and more particularly, to imaging systems exhibiting enhanced resolutions.

BACKGROUND OF THE INVENTION

Ultrasound imaging systems are now frequently used to image sound transmitting materials, such as internal body tissues for medical diagnostic and treatment purposes. Of critical importance to these systems is their ability to produce images of high resolution. Generally, in such systems, radially symmetric (circular) or rectangular apertures are used. In these systems a single aperture is used to both generate and receive acoustic pulses which are constructed into such images. A primary object of the present application is the provision of an apparatus and method using distinct transmitting and receiving apertures which are capable of providing images of superior resolution to those otherwise obtainable using single aperture systems.

In a typical acoustical imaging system, a transducer having a piezoelectric active element is utilized to produce a burst of acoustical energy. This energy is focused by an acoustical lens upon tissue which is located in the focal region. Sound which is scattered by the tissue is then detected by the transducer, and the information thus gained is used to construct a visual display corresponding to the acoustic properties of the subject tissue. Acoustic imaging systems may comprise one or more transducers. When a single transucer is utilized, the transducer is normally pivoted to scan a sector of material to be imaged. Linear transducer arrays have also been used to scan an underlying plane of target material. Linear array systems typically comprise a plurality of discrete rectangular transducers which are sequentially activated (alone or in preselected groupings) to transmit and receive sound to thereby image a series of linear target regions underlying the transducers. If desired, separate sets of these linear array transducers can be used in the send and receive modes to provide a variation in effective aperture size. See for example "*New Techniques And Instrumentation In Ultrasonography,* pp. 74–76 edited by P.N.T. Wells and M. Ziskin, Churchill Livingstone, N.Y. (1980).

The resolution of acoustic imaging systems is dependent upon a number of different factors. Due in part to diffraction, the intensity of sound in a focal region is at a maximum at the center of the beam, drops laterally to zero at the edge of the Airy disc, and is also peaked at lower intensities in a series of discrete areas surrounding the center of the focal region. When produced by a circular aperture, this central focal region is called the Airy disc, and theoretically contains approximately 84% of the acoustical power of the beam. Surrounding the Airy disc are rings called side-lobes or "Airy rings". Airy rings are rings of decreasing acoustic intensity which extend away from the central focal lobe or Airy disc. Representative plots of the power of acoustic energy in such a focal region are illustrated in FIGS. 1 and 2. The substantial amount of acoustic power distributed in the Airy rings or side-lobes interferes with and limits the resolution of most imaging systems.

Computer simulations and acoustical measurement systems such as ultrasonovision make it possible to calculate, predict, and measure the intensity distribution of acoustic energy expected to be generated and generated by apertures of interest. See "System for Visualizing and Measuring Ultrasonic Wave Fronts", by Mezrich, Etzold, and Vilkomerson, *Acoustical Holography,* Vol. 6, pp. 165–191 (197); "An Improved System for Visualizing and Measuring Ultrasonic Wave Fronts", by Vilkomerson, et al. *Acoustical Holography,* Volume 7, ed. Lawrence W. Kessler, Plenum Publishing Corp., (1977) pp. 87–101; and "Ultrasonic Waves: Their Interferometric Measurement and Display", by Mezrich, Vilkomerson and Etzold, *Applied Optics,* 15:1499 (June 1976). See also "Measuring Pulsed Picometer-Displacement Vibrations by Optical Interferometry", D. Vilkomerson, *Applied Physics Letters,* 29:3, 183–185 (August, 1976).

The effect on resolution which is caused by diffraction patterns has long been recognized in the fields of optics and acoustics. In both fields circular apertures are generally preferred since the diffraction patterns associated with such apertures are uniform and result in relatively lower diffraction pattern intensities. Other aperture shapes have occasionally been suggested in both fields for specific applications. See *Principles In Optics,* by N. Born and E. Wolf, Chapter 8, pp. 370–458, (3rd Ed., 1965) Pergamon Press, Oxford, England, which is hereby incorporated by reference. For example, in the field of astronomy, it has been suggested that two closely spaced discrete point light emitters, such as a star and a limb of the sun, can be differentiated by using a square optic aperture which, when properly oriented, exhibits a minimal diffraction pattern intensity in the specific region between the emitters, to thereby permit a better measurement of the apparent distance betweem those emitters. This technique is explained in "SCLERA: An Astronomic Telescope for Experimental Relativity", by J. R. Oleson, C. A. Zanoni, H. A. Hill, A. W. Healy P. B. Clayton, and B. L. Patz, *Applied Optics* 13:1, (Jan. 1974) 206–211, at 208. Similarly, for specific applications, varying shapes of ultrasound transducers have been suggested. For example, concave, sphercially or parabolically shaped radiators have often been suggested for geometrically focusing ultrasonic beams into a given focal region. Such focused apertures have been suggested as providing large effective depths of field without compromising lateral resolution. It has further been suggested to provide a number of annuli disposed in a flat or concave array for similar purposes. See for example "Electrical Patent Index Profile Booklet", S5 *Electromedical,* Week D29/032, Oct. 7, 1981, page 102, Derwent Publications Ltd., London WCIX8RP, England. Recently, various analytical expressions used to compute the transient pressure distributions of phased annular arrays with spherical geometry have been disclosed which may lead to improved transducer designs. See "Transient Fields of Concave Annular Arrays", by Arditi, Foster, and Hunt, *Ultrasonic Imaging* 3:37-61 (1981).

Dual transducer, or dual aperture, ultrasound imaging systems have also been proposed. For example, pulsing and receiving transducers of different resonant frequencies have been utilized for the purpose of investigating frequency changes which may occur within a given target medium. See for example "Electrical Patent Index Booklet", S5 *Electromedical,* Week D29/032, Oct. 7, 1981 page 97, Derwent Publications Ltd., London WCIX8RP England. In such systems, sound is typically transmitted from the pulsing transducer through a receiving transducer of differential resonant frequency, which inherently acts as a matching layer in this system.

More recently, other dual transducer ultrasound systems have been suggested for use in imaging applications. In "The Conical Scanner: A Two Transducer Ulrtrasound Scatter Imaging Technique", Foster et al, *Ultrasonic Imaging* 3:62-82 (1981), a system is described comprising a large conical transducer for generating an ultrasound beam that converges into a shapr line focus in the tissue being imaged, and a second circular transducer aimed along the axis of the cone to detect scattered ultrasound as a function of time, to thereby gather information which may be converted into a high resolution image.

It has also been suggested to use multiple apertures of differential focal lengths for alternatively imaging selected tissue portions. By using different sized apertures, different depths of field can be utilized to image these tissues portions. See U.S. Pat. No. 4,168,628 (Vilkomerson).

While the above-described acoustic imaging systems have experienced some degree of success, each of these systems has utilized transducer(s) which are radially symmetric with respect to the focal axis, and therefore produce substantially symmetric side-lobe patterns. While it has been recognized that the side-lobe echoes detected by such systems have interferred with image resolution, such limitations have heretofore been considered to be inherent drawbacks of acoustic imaging systems.

SUMMARY OF THE INVENTION

The present invention provides a novel conjugate aperture pulse-echo ultrasound imaging system offering improved resolution. This improved resolution is accomplished by generating a focused ultrasonic pulse having within its depth of field a radially asymmetric side-lobe pattern surrounding a central focal lobe, and by receiving the echo of said pulse by providing a receiver which exhibits a decreased sensitivity to echoes from the side-lobe pattern while retaining substantial sensitivity to echoes from the central focal lobe.

In the preferred embodiment, one conjugate aperture is used for transmission, and the other used to receive acoustical energy. By properly shaping these two apertures, the echoes of the side-lobe pattern generated by the transmitting aperture almost completely "miss" the side-lobe pattern of the other aperture, and are therefore not detected by the system. Preferably, these apertures are radially asymmetric transducers which are positioned along a common focal axis. These transducers are positioned so that their axes of asymmetry are disposed at different degrees of rotation with respect to the common focal axis so that the side-lobe (diffraction) pattern of the receiving transducer is offset with respect to the side-lobe pattern of the pulsing transducer. The preferred apparatus also exhibits enhanced resolution due to its provision of a central focal lobe having a smaller effective diameter than the focal lobe produced by a corresponding circular aperture. In the preferred embodiment, the first and second transducers are squares which are oriented in a "diamond-square" pattern.

Accordingly, a primary object of the present invention is the provision of an improved method for ultrasonically imaging sound transmitting materials such as body tissue.

A further object of the present invention is the provision of a pulse-echo ultrasound system which, at a given operating frequency, exhibits a relatively smaller effective central focal lobe.

A further object of the present invention is the provision of an ultrasound imaging system exhibiting decreased sensitivity to side-lobe echoes.

A further object of the present invention is the provision of a pulse-echo ultrasound system exhibiting improved image resolutions.

These and other objects of the present invention will become apparent from the following more detailed description.

DESCRIPTION OF THE PREFERRED EMBODIMENTS

Although specific materials, methods and apparatus are referred to in the following description for purposes of illustration, one of ordinary skill in the art will recognize that various changes may be made to these materials, methods and apparatus without departing from the scope of the present invention, which is defined more particularly in the appended claims.

Figure 1:
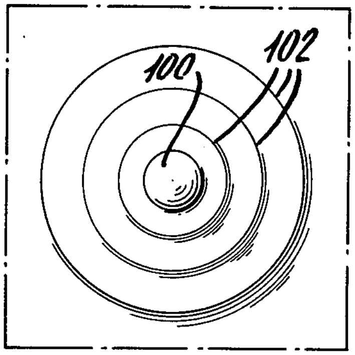
FIG. 1 is a diagrammatic representation of the acoustic energy of a focused acoustic beam produced by a radially symmetric (circular) aperture in its focal region, showing a high intensity central Airy disc surrounded by a plurality of lesser intensity Airy rings.
Figure 2:
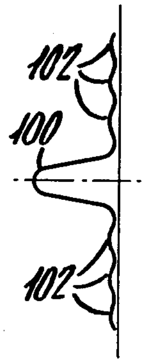
FIG. 2 is an intensity vs. distance plot of the beam section shown in FIG. 1, wherein the intensities of the Airy disc and Airy rings are diagrammatically represented.
Figure 6:
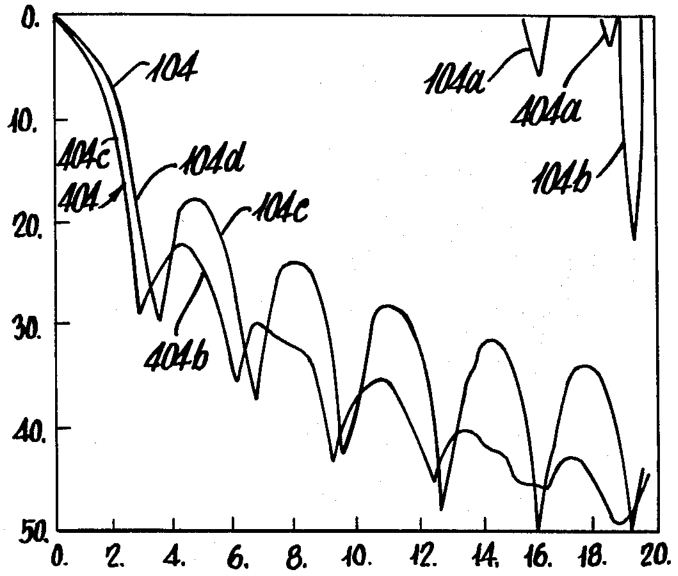
FIG. 6 is an average effective intensity graph for the preferred embodiment diamond-square aperture compared to a similar graph for a corresponding circular aperture, the vertical axis being given in dB and the horizontal axis being plotted in the dimensionless variable rho (the spacing between each of the horizontal tick marks is two rho)

As mentioned above, FIG. 1 is an intensity plot at the cross-section of the focus of an ultrasound beam produced by a circular aperture. The beam comprises a central Airy disc 100 and a plurality of side-lobes or Airy rings 102, which are concentric rings of decreasing intensity disposed around Airy disc 100. FIG. 2 is a plot of the power in the cross-section of the beam of FIG. 1 showing the central peak of Airy disc 100 and the intensities of surrounding Airy rings 102. For a circular aperture, theory predicts that 83.8% of the power will lie in the Airy disc. Unfortunately for medical imaging there is a substantial amount of power in the Airy rings. Those of ordinary skill in the art will recognize that computer simulations may be used to calculate the sound intensity within the Airy disc, and within the Airy rings. In FIG. 6, plot 104 is a plot of a circular aperture in which the intensity in dB is plotted on the vertical axis and the distance in the dimensionless variable rho is plotted on the horizontal plot. The variable rho is a convenient variable because the graph represented in FIG. 6 remains the same when the physical dimensions of the imaging system change. Defining D to be the diameter of the aperture, theta to be one-half of the focal angle, lambda to be the acoustic wave length, rho is defined as follows:

$$\text{rho} = \frac{1}{2}\,\frac{2\pi}{\text{lambda}}\,D\sin(\text{theta})$$

In FIG. 6, the first side-lobe of the circular aperture will be seen to have an intensity reduced by 17.7 dB and the second side-lobe by 23.7 dB from the intensity of the peak. The first minimum falls at rho equal to 3.8 which corresponds to the ½ width of the focal lobe. In accordance with the plotting program used to generate the plots in FIG. 6, for those graphs where the 50 db range of the vertical axis is not sufficient to show the entire intensity plot, the plotting program automatically starts drawing from the top again with a fine line (this plotting routine uses discrete points, and thus may not represent the true minimums if such minimums fall between such points). In FIG. 6, peaks **104*a* and 104*b*** represent plots in the −50 to −100 dB range.

The limit of acoustical resolution is determined by the intensity distribution in the focal region. In accordance with the present invention, two apertures are utilized, one to transmit and one to receive, which apertures act in combination to decrease the size of the acoustical probe. In the preferred embodiment, these conjugate apertures transmit with a diamond aperture and receive with a square aperture. Since the side-lobe patterns of these apertures "miss" each other to a large extent, not only is the sensitivity to the side-lobe pattern decreased, but the size of the central disc is also reduced. The result is a pulse-echo imaging system with increased resolution.

The present invention thus provides a novel method for imaging sound body tissue. This method comprises generating a focused ultrasonic pulse directed at body tissue which should exhibit within its depth of field a radially asymmetric side-lobe pattern surrounding a central focal lobe. Echoes from this pulse are received by providing a receiver which exhibits a relatively decreased sensitivity to echoes from said side-lobe pattern and a relatively increased sensitivity to echoes from said central focal lobe. Such received echoes are then utilized to display an image of body tissue, which image exhibits a relatively enhanced resolution.

Figure 3:
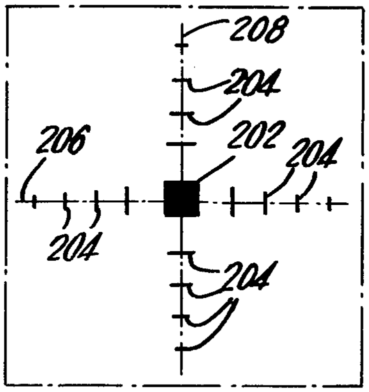
FIG. 3 shows the diffraction pattern (intensity distribution) in the focal plane generated by a square aperture.

FIG. 3 shows the diffraction pattern (intensity distribution) in the focal plane generated by a square aperture. If the aperture is transmitting, most of the power will fall in the central square 202. A small, but disturbing amount of power will fall on the surrounding dark lines 204. These side-lobe patterns 204 will be seen to be quadralaterally symmetric, that is, to have axes of side-lobe intensity 206 and 208. Unfortunately, when this aperture, disposed in the same orientation, is used to receive, it is sensitive to radiation from just those areas into which power was transmitted. Hence, the aperture is sensitive to the power that was transmitted into the lines or side-lobes 204. This increases the size of the acoustical probe from just the central spot to a larger area including the side-lobes, and would normally result in reduced resolution by comparison to circular apertures.

Figure 4:
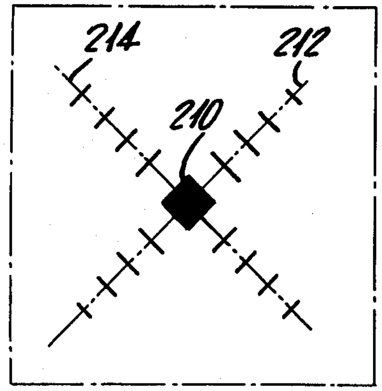
FIG. 4 shows a diffraction pattern (intensity distribution) in the focal plane generated by a square aperture which has been rotated 45° with respect to the aperture which produced the intensity distribution of FIG. 3.

Pulse echo acoustic imaging systems not only transmit acoustical energy, but also receive echoes of that energy. In accordance with the present invention, however, the same aperture is not used to transmit and receive acoustical energy. Instead, a second aperture which is relatively rotated with respect to the focal axis receives the acoustic echoes. If the echoes of the acoustical energy represented in FIG. 3 are received with a square aperture that has been rotated 45°, the imaging system will exhibit a relatively enhanced sensitivity to echoes from the focal lobe 202 and a relatively decrease sensitivity to the echoes from side-lobes 204. The intensity distribution for the second conjugate aperture, which is a square rotated by 45°, is shown in FIG. 4. By comparing FIGS. 3 and 4 it will be seen that the central squares will still fall on each other, however, the lines forming the side-lobes now do not fall upon each other to any appreciable extent. Accordingly, in the preferred embodiment, the axes 212 and 214 of side-lobe intensity are oriented to bisect the axes 206 and 208 of side-lobe intensity of these transmitting aperture to maximize the side-lobe "mismatch" between the transmitting and receiving apertures.

Figure 5:
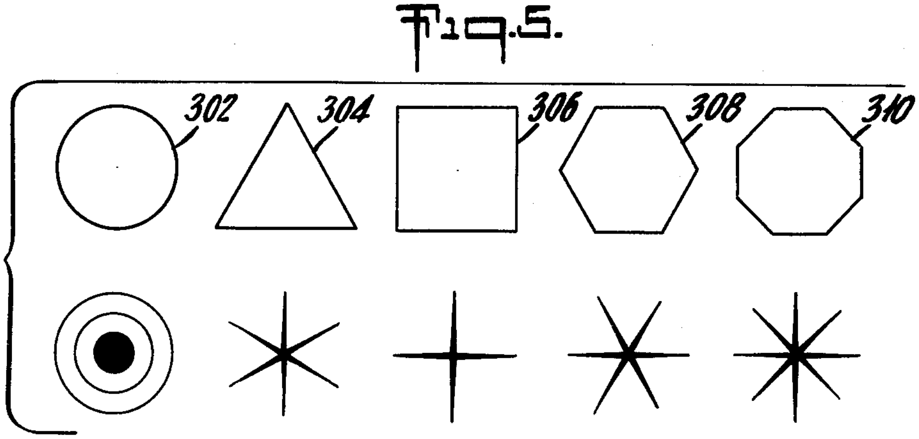
FIG. 5 is a diagrammatic view of various aperture shapes each of which is disposed above its corresponding focal plane diffraction pattern (intensity distribution)

Apertures of various shapes have conjugates which can be used to maximize side-lobe mismatch. In FIG. 5, several such apertures are illustrated above their corresponding acoustical intensity distributions in the focal plane. Aperture 302 is a circular aperture having an Airy disc and Airy rings similar to those described above in connection with FIGS. 1, 2 and 6. While it is theoretically possible to provide a "conjugate" aperture for this disc by using a receiver of a smaller size, decreases in the depth of field and resolution which are attendant to using such a radically different aperture size dictate against using conjugate circular apertures in imaging systems. Instead, the present invention relates to the provision of apertures which generate ultrasonic pulses having, within their depths of field, a radially asymmetric side-lobe pattern surrounding the focal lobe. Shapes 304-310, are examples of aperture shapes meeting such criteria. Square 306 is seen disposed above the acoustical intensity pattern generated thereby, which is characterized by a central focal lobe having two axis of side-lobe intensity. Triangular aperture 304 and hexagonal aperture 308 each generate intensity patterns, as illustrated in FIG. 5, which are characterized by three axes of side-lobe intensity, while octagonal aperture 310 generates an intensity pattern wherein the central focal lobe is surrounded by side-lobe patterns having four axes of intensity.

Due to the low number of side-lobe intensity axes exhibited by square apertures, such apertures have been selected for use in the preferred embodiment of the present invention. In accordance with the present invention, it is preferred, but not necessary, to provide transmitting and receiving apertures having the same resonant frequency ranges and geometric configurations, providing their shapes and orientations are such that a substantial degree of side-lobe mismatch is created using the selected aperture pair. For example, conjugate diamond apertures which are rotated with respect to each other, preferably by about 30°, could be used to create such a side-lobe mismatch. Alternatively a diamond aperture 304 could be used with hexagonal aperture 308 in the illustrated orientations to produce a desirable side-lobe mismatch. It is also within the scope of the present invention to utilize other non-circular apertures, that is, apertures which are not radially symmetric with respect to the focal axis. In view of the description contained herein, one of ordinary skill in the art will recognize that non-cicular apertures such as ellipical apertures can be used to perform the method of the present invention. Further, while it is desired to maximize the mismatch between the axes of side-lobe intensity by orienting the apertures so that the respective side-lobe intensity axes will bisect each other, those of ordinary skill in the art will recognize that a complete mismatch is not required in order to achieve the benefits of the present invention, provided a significant degree of side-lobe intensity mismatch is created through an appropriate selection of aperture geometry and orientation. It is generally preferred to select aperture pairs having approximately the same size. Although it has been found that the resolution of a given aperture pair may be "fine tuned" by slightly offsizing the pairs with respect to each other, in no instance is it anticipated that apertures should be differentially sized by more than one f number.

Using the standard equation for the difraction pattern of a square aperture, the intensities generated by square apertures are easily calculated for any given point of interest in the focal plane. To obtain the sensitivity for a diamond-square aperture system (that is, two identical square apertures which are rotated with respect to the focal axis by 45°), the two intensity distributions are multipled together, and then square root is taken to produce graphs which correspond to normal intensity distribution graphs. (Normal intensity distribution graphs are plotted for just the transmit or receive sensitivity.) In this manner, the effective intensity distribution for two apertures can be plotted. Not surprisingly, the effective intensity distribution for a diamond-square dual aperture system is not symmetrical around the central disc as it is for a round aperture. Accordingly, one approach for describing the intensity distribution around a diamond-square aperture would be to describe the intensity taken at various degrees of rotation within a 45° sector which is representative of one octant of the quadralaterally symmetrical intensity distribution. Such plots, however, will provide little information concerning the total effective sensitivity of the diamond-square aperture system. Accordingly, it is presently preferred to estimate the total effective sensitivity of the diamond-square system by averaging the intensities of multiple plots at different angles to produce a graph showing the average intensity at given radii. Such graphs will then be comparable plots for circular apertures such as plot 104, which was previously discussed in connection with FIG. 6. Plot 404 of the FIG. 6 is the result of such averaging and represents the average effective sensitivity of a diamond-square aperture. The first side-lobe, 404*b* in FIG. 6 is seen to be disposed below 20 dB, which is the usual limit of sensitivity of many commercial available pulse-echo imaging machines. By comparison, the first side-lobe 104*c* of the circular aperture is above the 20 dB level of sensitivity. Also, the central intensity pattern, as indicated by central focal lobe 404*c* will be seen to be smaller for the diamond-square aperture than for the central focal lobe 104*d* of the circular aperture, for a diameter of the circle equal to the length of the side of the square. The first point of zero intensity occurs at 2.8 rho for the diamond-square, and at 3.8 rho for the circular aperture. This represents a 35% decrease in the diameter of the central spot, which size decrease should result in a substantial increase in the image resolution produced using the diamond-square system.

The above described diamond-square system utilizes identical squares which are rotated by 45° with respect to each other. Additional computer simulations have been performed to determine whether a smaller central spot and minimal side-lobe interference can be obtained using different diamond-square configurations. To date, such simulations suggest that when one aperture has sides which are 95% of the length of the sides of the other aperture (at a rotation of 45°), some improvement in central spot and side-lobe intensity can be achieved. However, the differences between these configurations and the identical size diamond-square configuration discussed above, are slight, and thus for practical considerations relating to transducer fabrication procedures, etc., differentially sized apertures are not presently preferred.

Although computer simulations are convenient methods for examining the intensity produced by modified apertures in the focal plane, calculations of intensities become protracted when one tries to calculate intensity profiles outside the focal plane. Accordingly, an ultrasonovision has been used to measure the intensity of non-circular apertures outside their focal planes, primarily for the purpose of determining whether the depth of field produced by non-circular (square) apertures compare favorably to the depth of field of conventional circular apertures. The depth of field of a 1.5 inch per side square aperture has been compared to the depth of field of a 1.5 inch diameter circular aperture oscillating at 4 MHz and a focal length of 9 inches. Construing the depth of field to be the distance at which the size of the central spot approximately doubles, the depth of field of the circular aperture was determined to be 4 inches. The depth of field for the square aperture was found to be at least as large as for the round aperture.

Figure 7:
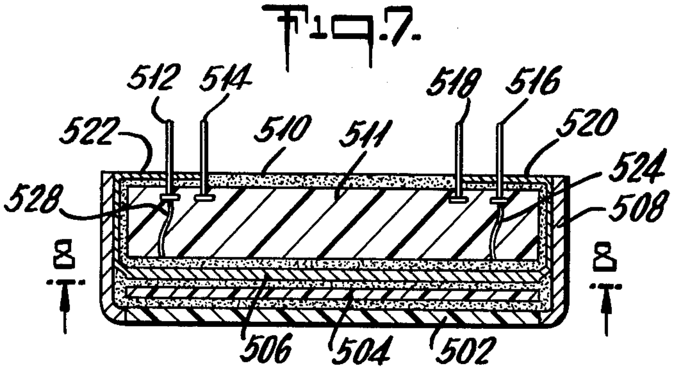
FIG. 7 is a cross-section through the side of a preferred embodiment diamond-square transducer in accordance with the preferred embodiment of the present invention.

FIG. 7 is a diagrammatic cross-section of a prefered embodiment transducer for use in the pulse-echo ultrasound system of the present invention. This transducer is generally constructed in accordance with the methods and using the materials disclosed in the patent application of Andreas Hadjicostis entitled "Short Ring Down, Ultrasonic Transducer Suitable For Medical Applications", Ser. No. 335,920, filed Dec. 30, 1981, which is assigned to the assignee of the present application and which is hereby incorporated by reference as if fully set forth herein. The preferred transducer of FIG. 7 comprises an active element 506 and matching layers 502 and 504. These components are disposed in a stainless steel case 508 together with a backing material 511, which may be a filled epoxy material, such as Stycast, sold by Emerson & Cummings, Inc. The active element 506 is preferably a single crystal lithium niobate active element having a one half wave length thickness. Those of ordinary skill in this art will recognize that the matching layers 502 and 504 should be selected from materials having acoustic impedances and thicknesses which are appropriate to improve the coupling efficiency between active element 506 (which has an acoustic impedance of about $34.6\times10^6$) and the target medium (which often has an acoustic impedance approximately equal to water, e.g. about $1.5\times10^6$). The backing material 511, active element 506 and matching layers 502 and 504 are bonded to each other and to the stainless steel case 508 with an adhesive such as an epoxy adhesive, 510.

Active elements, such as active element 506, typically comprise conductive coatings (electrodes) disposed on both sides of a wafer of piezoelectric material. These active elements transform differing potentials which are applied to these electrodes into acoustic energy. In conventional transducers it is known to split each of the electrodes on the face of the active element into electrically distinct portions so that individual portions of the active element may be separately activated in combination with its complimental electrode on the opposite face of the piezoelectric material. Such distinct electrode portions are created by cutting or etching portions of the electrode coating away from lines defined along the faces of the piezoelectric material to provide active element portions which may be independently activated.

Figure 8:
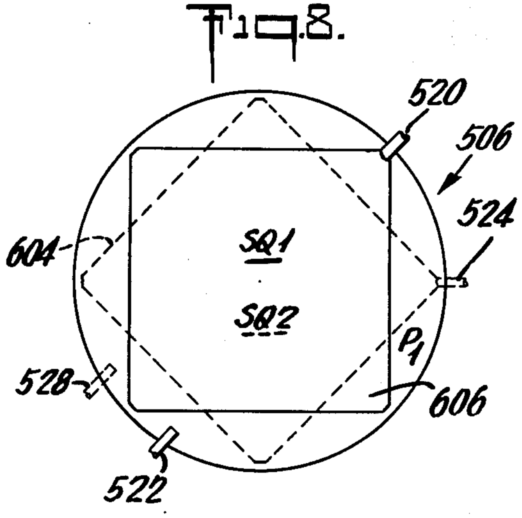
FIG. 8 is a cross-section of the transducer of FIG. 7 taken in accordance with the lines and arrows 8—8 in FIG. 7.

The preferred active element-electrode configuration of the transducer of FIG. 7 is diagrammatically shown in FIG. 8, which is a bottom view of this active element. Active element 506 comprises a wafer of lithium niobate piezoelectric material 602 which is disposed between two gold foil electrode layers see FIG. 9. Each of these layers has been etched with a substantially square pattern to provide two discrete electrode surfaces on each face of the piezoelectric wafer. As shown in FIG. 8, a first square ($Sq_1$) with three very slightly rounded corners defines electrode portion 606. This portion is connected to lead 520, and is electrically distinct from electrode region $P_1$ which otherwise covers the face of the piezoelectric wafer. Electrode region $P_1$ is connected to lead 522. The electrode surface on the other face of the piezoelectric wafer is similarly etched to define a second square ($Sq_2$) and surrounding electrode region $P_2$ which are connected to leads 524 and 528 respectively $Sq_2$ is disposed at a 45° angle with respect to $Sq_1$. As shown in FIG. 7, leads 520, 522, 524 and 528 are connected to pins 512, 514, 516 and 518 which in turn are connected to the matching network schematically illustrated in FIG. 9.

Figure 9:
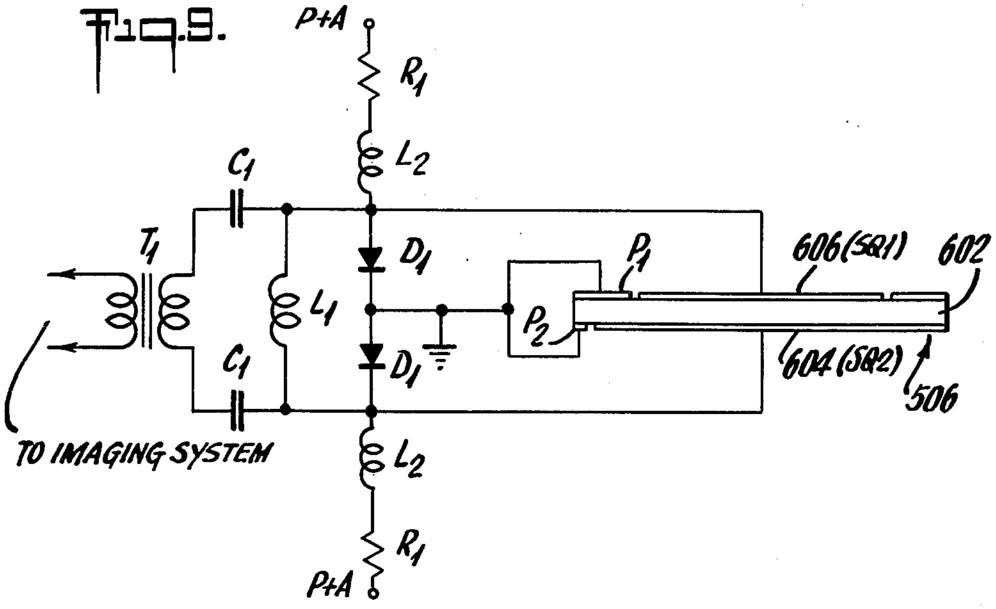
FIG. 9 is a diagrammatic side view of the active element unit of FIG. 10 shown in connection with a schematic of the preferred matching circuit of the present invention.

FIG. 9 is a diagrammatic side view of active element 506 shown in combination with a schematic diagram of the preferred matching network of the present invention. Applicants have recognized that a single wafer of piezoelectric material 602 may be used to both transmit and receive acoustic energy in accordance with the method of the present invention. This is facilitated by providing active element means for changing the effective aperture of this piezoelectric material. By alternatively creating a positive or negative charge on one of the electrode squares of the active element and grounding the remaining portions of the faces of the piezoelectric wafer (including in particular the electrode surface surrounding the charged square), it is possible to use such an active element as a pulsing aperture means for producing sound focused into higher intensities central focal lobe and asymmetric side lobe regions. For example, where $Sq_1$ is to be used as the pulsing aperture, electrode areas $P_1$, $P_2$, and $Sq_2$ should all be grounded when the active element is operated in the transmit mode. By grounding the $P_1$ electrode area surrounding $Sq_1$, the piezoelectric material 602 which is disposed between two grounded electrode surfaces is effectively "clamped" so that it will not contribute to the production of acoustic energy by the active element. In the receive mode, by switching the grounding to $Sq_1$ and activating $Sq_2$ the aperture is effectively rotated by 45° to provide a receiving aperture means for receiving echoes of sound produced by the pulsing aperture means which is configured and positioned to exhibit a greater sensitivity to echoes from the central focal lobe than to echoes from the side lobes. The switching of grounds between $Sq_1$ (606) and $Sq_2$ (604) is preferably accomplished by using the matching network schematically illustrated in FIG. 9. The matching network of FIG. 9 comprises a PIN diode switching means for alternatively activating and grounding opposing electrode squares. Pt A is a point of common potential to which a switching signal, such as a ±twelve volt square wave signal, is applied. This switching signal controls the activation and grounding of the opposing electrode squares. In the schematic of FIG. 9, resistors $R_1$ are current limiting resistor's. Inductors $L_2$ are RF blocking inductors. When the potential at point A is high (positive) then the PIN diodes act to ground square 1. When Pt A is low (negative) then $Sq_2$ is grounded. By providing a square wave of appropriate frequency, squares 604 and 606 will be grounded alternatively while the opposing square is activated to function in the pulsing or receiving mode.

In the preferred matching network of FIG. 9, the transformer $T_1$ is a matching transformer for a 124 ohm cable and has an effective primary:secondary ratio of 1:9. The transformer is protected from direct current saturation by capacitors $C_1$ (0.47 microfarad). Inductor $L_1$ is preferably a 1.5 to 2.7 microHenry variable inductor. Inductors $L_2$ are 10 microHenry inductors used in combination with 10 ohm resistors $R_1$. The preferred PIN diodes $D_1$ may be purchased from KSW Electronics Corp. of Burlington, Mass. (cat. KS1003).

Figure 10:
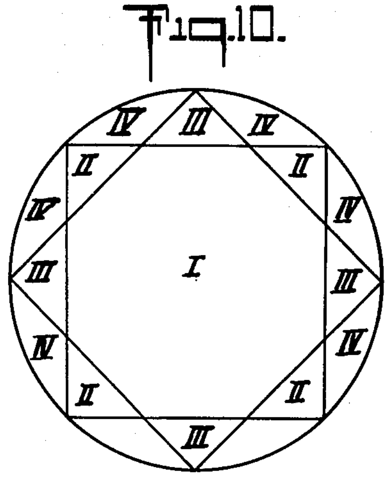
FIG. 10 is a diagrammatic illustration of a single plane, diamond-square active element for use in accordance with the methods of the present invention.

In FIG. 10, an alternate preferred embodiment active element is disclosed using a single plane active element. In this embodiment, one face of the piezoelectric material is covered with 17 electrically distinct electrode regions. Region I is a common area between the two apertures. Regions II represents the tips of the diamond aperture, and Regions III the tips of the square aperture. Regions IV, and the electrode on the back of the piezoelectric material are grounded at all times. In the transmit mode, Regions I and II are electronically tied together forming the diamond. In the receive mode, Regions I and III are connected. This combined diamond-square single piezoelectric disc transducer element may be substituted as the active element 502 in the transducer of FIG. 7.

Those of ordinary skill in the art will recognize that a slight rounding of the corners of various electrode regions may be desired in order to simplify the interconnection of closely spaced electrode regions, such as electrode regions $P_1$ and $P_2$ in the embodiment of FIGS. 7–9, and IV in the embodiment of FIG. 10. Such slight modifications in the shape of the transducer aperture will not substantially effect the side lobe patterns generated thereby. In each instance, however, care should be taken to minimize the effect of the relatively higher resistances created by the narrowed electrode regions adjacent to the tips of the square. For this reason, leads 522 and 528 are positioned so that they are not removed from any electrode region by more than two of such narrowed electrode portions. In this manner, regions approximately 1/100 of an inch wide have been found to be suitable for connecting adjacent electrode portions, such as portions $P_1$ or $P_2$.

One of ordinary skill in the art will recognize from the above description that a number of different techniques may be utilized to generate an ultrasonic pulse having within its depth of field a radially asymmetric side-lobe pattern surrounding the central focal lobe. As used herein, the term "aperture" has been used to refer to that component or components of the ultrasonic imaging system which creates the desired asymmetric diffraction pattern, and/or which provides a receiver exhibiting a differential sensitivity to echoes from a particular radially asymmetric-side-lobe pattern. Accordingly, while the use of different shaped transducers and transducer electrodes have been discussed in connection with the provision of conjugate apertures suitable in practicing the present invention, those of ordinary skill in the art will also recognize that it is within the scope of the present invention to utilize other techniques for practicing the preferred methods of the present invention.

Figure 11:
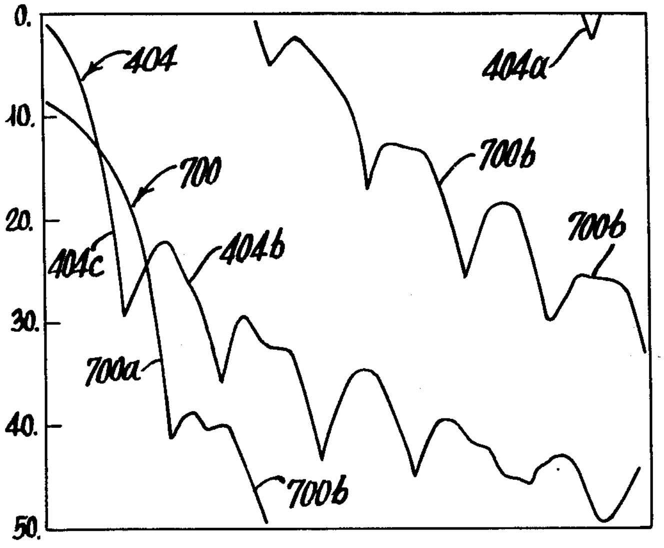
FIG. 11 is a plot similar to FIG. 6 showing graphs for apodized and unapodized diamond-square apertures.

It is presently anticipated that the conjugate apertures of the present invention may also be apodized to reduce the first side-lobe pattern. In FIG. 11 the rho vs. intensity plot 700 for diamond-square aperture which has been apodized with a cosine function is illustrated and compared to the unapodized intensity plot 404 illustrated in FIG. 6. Apodization is shown to result in a much lower side-lobe intensities *700b*, albeit at the expense of a somewhat larger central focal lobe *700a*. At the present time, it is not desired to apodize the preferred embodiment diamond-square apertures of the present invention since such apertures already may be expected to produce first side-lobe patterns having intensities of less than 20 dB with respect to the intensity of the focal lobe. There are several convenient ways to reduce the intensity of the edge of the subject transducers. Shaped absorbers can be placed over the face of the transducer, or alternatively, the conducting (electrode) layers on the active element of the transducer can be modified so that the excitation is less at the aperture edges. Matching layers can also be modified to reduce their efficiency at the edges of the transducers. If one apodizes, it is presently preferred to reduce the amount of transmission at the edge of the subject transducers by between 1% (22 dB) and 10% (10 dB) of the acoustical energy transmitted.

From the above description, one of ordinary skill in the art will recognize that the distribution of side-lobe energy around the central focal lobe and the sensitivity to such distributions are important attributes of transducers selected for use in the apparatus of the present invention. As used herein, the term "axis of side-lobe intensity" has been used as a convenient term for identifying regions of increased side-lobe intensity, particularly, regions which are conveniently bisected by a line connecting points of maximum side-lobe intensity at given radii from the focal axes. For purposes of predicting the mismatch of side-lobe intensities, it may also be convenient to characterize the shape of apertures which create patterns having identifiable axes of side-lobe intensity. Accordingly, some of the radially asymmetric apertures useful in the present invention may be described as having particular axes of bilateral symmetry which correspond to the axes of side-lobe intensity produced thereby. For polygons, such axes normally are those axes which bisect the sides of the polygons. For continuous, non-circular transducers, at least one axis of bilateral symmetry will normally correspond to the minor (i.e. shorter) axis of the aperture. For more complex figures, one of ordinary skill in the art will recognize the desirability of using an ultrasonovision in evaluating the location of the axes which correspond to axes of side lobe intensity for a given aperture shape, by referring to the location of the axes of side-lobe intensity created by that aperture. Those of ordinary skill in the art will further recognize that the side-lobe mismatches contemplated by the present invention should be of sufficient significance to more than counteract the otherwise corresponding difficiencies associated with using non-radially symmetric transducers. In most instances, mismatches of at least 10% of the side-lobe intensities are desired to achieve the objects of the present invention.

As seen from the above, a simple efficient pulse echo ultrasound system is disclosed which is capable of producing better resolutions than those heretofore achieved by prior art systems.

We claim:

1. A pulse-echo ultrasound system including an active element of piezoelectric material having a plurality of acoustic apertures formed of separate electrode areas positioned generally along a common focal axis, comprising:

(a) a first pulsing aperture means including a first one of said electrode areas for producing sound focused into higher intensity central focal lobe and asymmetric side lobe regions; and (b) a second receiving aperture means including a second one of said electrode areas for receiving echoes of sound produced by said pulsing aperture means, said receiving aperture means being rotated about said common focal axis with respect to said pulsing aperture means so as to exhibit a greater senstivity to echoes from said central focal lobe than to echoes from said side lobes.

2. The invention of claim 1 wherein said apertures are polygonal.

3. The invention of claim 2 wherein said apertures are corresponding polygons.

4. The invention of claim 3 wherein said polygons are rectangles.

5. The invention of claim 4 wherein said rectangles are squares.

6. The invention of claim 4 wherein said squares are positioned at 45° with respect to each other.

7. The invention of claim 1 wherein said second aperture is positioned so that its axes of side-lobe intensity bisect the axes of side-lobe intensity of said first aperture.

8. The invention of claim 1 wherein the solid focal angles of said apertures overlap.

9. The invention of claim 1 wherein said apertures are triangular, and are rotated with respect to each other by about 30°.

10. The invention of claim 1 wherein said apertures are hexagonal and are rotated with respect to each other by about 30°.

11. The invention of claim 1 wherein said aperetures are octagonal and are rotated with respect to each other by about 22.5°.

12. The invention of claim 1 wherein said first pulsing aperture means comprises a pulsing means for activating a first portion of said active element.

13. The invention of claim 12 wherein said second aperture means comprises a sensing means for sensing sound received by a second portion of said active element.

14. The invention of claim 13 wherein said first one of said electrode areas comprises an electrode configured to correspond to said first portion disposed on one surface of said active element.

15. The invention of claim 14 wherein said second one of said electrode areas comprises an electrode configured to correspond to said second portion disposed on a second surface of said active element.

16. The invention of claim 15 wherein said electrodes are squares disposed on the opposite surfaces of a disc-shaped active element.

17. The invention of claim 16 wherein said squares are disposed at differing degrees of rotation with respect to the focal axis of the active element.

* * * * *